US012654623B2

(12) United States Patent
He

(10) Patent No.: US 12,654,623 B2
(45) Date of Patent: *Jun. 16, 2026

(54) ANTI-THEFT FIXING DEVICE AND ANTI-THEFT VEHICLE ROOF RACK CROSSBAR

(71) Applicant: Zhijun He, Ezhou (CN)

(72) Inventor: Zhijun He, Ezhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/244,037

(22) Filed: Jun. 20, 2025

(65) Prior Publication Data

US 2025/0313157 A1     Oct. 9, 2025

Related U.S. Application Data

(63) Continuation of application No. 18/461,518, filed on Sep. 6, 2023.

(51) Int. Cl.
B60R 9/052     (2006.01)
B60R 25/01     (2013.01)

(52) U.S. Cl.
CPC ............. B60R 9/052 (2013.01); B60R 25/01 (2013.01)

(58) Field of Classification Search
CPC ............................... B60R 9/052; B60R 25/01
USPC ........................................................ 224/309
See application file for complete search history.

(56) References Cited

U.S. PATENT DOCUMENTS

| | | | | |
|---|---|---|---|---|
| 10,040,403 B2 * | 8/2018 | McFadden | ............. | B60R 9/058 |
| 10,124,738 B2 * | 11/2018 | Cronin | .................... | B60R 9/045 |
| 11,679,724 B2 * | 6/2023 | Dayani | ................... | B60R 9/052 |
| | | | | 224/309 |
| 2006/0283900 A1 * | 12/2006 | Stapleton | ............... | B60R 9/058 |
| | | | | 224/330 |
| 2010/0237116 A1 * | 9/2010 | Hubbard | ................ | B60R 9/058 |
| | | | | 224/558 |
| 2010/0282799 A1 * | 11/2010 | Hubbard | ................. | B60R 9/045 |
| | | | | 224/320 |
| 2011/0174853 A1 * | 7/2011 | Hubbard | ................. | B60R 9/045 |
| | | | | 224/309 |
| 2022/0161732 A1 * | 5/2022 | Keck, II | .................. | B60R 9/058 |
| 2023/0108570 A1 * | 4/2023 | Barberis | ................ | B60R 9/058 |
| | | | | 224/321 |

* cited by examiner

*Primary Examiner* — Peter N Helvey

(57)     ABSTRACT

An anti-theft fixing device and an anti-theft vehicle roof rack crossbar are provided. The anti-theft fixing device includes a fixing main body, an anti-theft body, a cover body, and a lock member. The fixing main body includes a fixing portion and a connecting portion, the fixing portion is fixedly connected to the connecting portion, the fixing portion includes at least one fixing hole. The connecting portion further includes a mounting hole, and the connecting portion further includes a first surface and a second surface opposite to the first surface. The anti-theft body includes an anti-theft portion disposed on an inner surface thereof and mounted onto the mounting hole so that the anti-theft portion detachably connected to the first surface of the connecting portion to cover the at least one fixing hole.

19 Claims, 6 Drawing Sheets

ANTI-THEFT FIXING DEVICE AND ANTI-THEFT VEHICLE ROOF RACK CROSSBAR

CROSS-REFERENCE TO RELATED APPLICATIONS

This application is a continuation application of the U.S. application Ser. No. 18/461,518, filed on Sep. 6, 2023. The disclosure of which is hereby incorporated by reference in their entireties.

TECHNICAL FIELD

The present disclosure relates to a technical field of fixing frames for vehicles, and in particular to an anti-theft fixing device and an anti-theft vehicle roof rack crossbar.

BACKGROUND

Vehicle luggage racks are also known as vehicle roof racks, vehicle roof crossbars, vehicle roof luggage racks, automobile roof racks, and roof cargo carriers. The vehicle luggage racks refer to racks mounted on vehicle roofs and convenient for tying large articles, and are a basis for all carrying schemes of the vehicle roofs. The vehicle luggage racks are generally used for road trips, which cooperate with vehicle roof boxes and vehicle roof frames to carry luggage and increase a carrying space of vehicles, and the vehicle luggage racks may further carry sports equipment, such as snowboards, bicycles, sailboats, etc.

A conventional vehicle luggage rack generally includes vehicle roof rack crossbars, all of the vehicle roof rack crossbars are fixed to a roof of a vehicle to form the conventional vehicle luggage rack. The vehicle roof rack crossbars are generally locked on the roof of the vehicle through screws, and the screws are exposed on the roof of the vehicle, causing a risk that the screws are easily detached by a thief through detaching tools. As a result, the conventional vehicle luggage rack may be stolen, and even the luggage on the vehicle luggage rack may be stolen.

SUMMARY

In one aspect of the present disclosure, an anti-theft fixing device includes a fixing main body, an anti-theft assembly, and a lock member. The fixing main body defines at least one fixing hole. The anti-theft assembly is connected to the fixing main body and covers the at least one fixing hole. The lock member is mounted to the anti-theft assembly and is configured to lock the anti-theft assembly to the fixing main body.

In another aspect of the present disclosure, an anti-theft fixing device includes a fixing main body, an anti-theft assembly, and a lock member. The fixing main body includes a fixing portion and a connecting portion fixedly connected to the fixing portion. The fixing portion defines at least one fixing hole. The fixing portion and the connecting portion cooperatively define a first accommodating groove communicated with the at least one fixing hole. The anti-theft assembly is at least partially accommodated in the first accommodating groove, connected to the fixing main body, and covers the at least one fixing hole. The lock member is mounted to the anti-theft assembly, and is configured to lock the anti-theft assembly to the fixing main body.

In further another aspect of the present disclosure, an anti-theft vehicle roof rack crossbar includes a first anti-theft fixing device, a second anti-theft fixing device, and a connecting rod assembly. The connecting rod assembly is connected to the first anti-theft fixing device and the second anti-theft fixing device, the first anti-theft fixing device and the second anti-theft fixing device are respectively located at two ends of the connecting rod assembly. The first anti-theft fixing device is the anti-theft fixing device as foregoing, and the second anti-theft fixing device is the anti-theft fixing device as foregoing.

BRIEF DESCRIPTION OF DRAWINGS

In order to more clearly illustrate technical solutions in embodiments of the present disclosure, accompanying drawings that need to be used in description of the embodiments are briefly described below. Obviously, the accompanying drawings in the following description are merely some embodiments of the present disclosure, and for those who skilled in the art, other drawings may be obtained according to these drawings without involving any inventive effort.

For a more complete understanding of the present disclosure and beneficial effects thereof, the following description is made below in conjunction with the accompanying drawings, in which same reference numerals refer to same parts in the following description.

DETAILED DESCRIPTION

Reference herein to "embodiment" or "implementation" means that a particular feature, structure, or characteristic described in connection with the embodiment or the implementation may be included in at least one embodiment of the present disclosure. The embodiment or the implementation in various positions in the specification are not necessarily all referring to the same embodiment, and are not independent or alternative embodiments mutually exclusive of other embodiments. Those who skilled in the art explicitly and implicitly understand that embodiments described herein may be combined with other embodiments.

Embodiments of the present disclosure provide an anti-theft fixing device and an anti-theft vehicle roof rack crossbar. The anti-theft vehicle roof rack crossbar is fixed to a roof of a vehicle through components, such as screws, and after fixing to the roof of the vehicle, the components, such as the screws, of the anti-theft vehicle roof rack crossbar are hid, that is, the screws are not exposed to the roof of the vehicle, thereby reducing a risk that the anti-theft vehicle roof rack crossbar is stolen. The anti-theft vehicle roof rack crossbar includes one or more anti-theft fixing devices, and the anti-theft vehicle roof rack crossbar including two anti-theft fixing devices is described as an example below with reference to accompanying drawings.

It should be noted that the anti-theft fixing device serves as a part of the anti-theft vehicle roof rack crossbar, that is, the anti-theft fixing devices is applied to the anti-theft vehicle roof rack crossbar, and the anti-theft fixing devices is configured to fixedly connect with the roof of the vehicle.

Technical solutions in embodiments of the present disclosure are clearly and completely described below with reference to accompanying drawings in the embodiments of the present disclosure. Obviously, the described embodiments are only a part of the embodiments of the present disclosure, but are not all embodiments. The following description of at least one exemplary embodiment is merely illustrative and is in no way intended as any limitation on the present disclosure and also its application or use. All other embodiments obtained by those who skilled in the art based on the embodiments of the present disclosure without creative efforts shall fall within the protection scope of the present disclosure.

Figure 1:
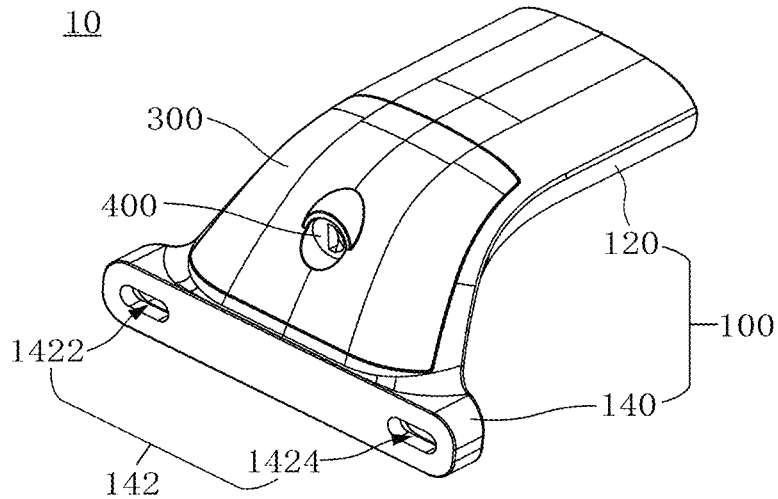
FIG. 1 is a perspective schematic diagram of an anti-theft fixing device according to one embodiment of the present disclosure.
Figure 2:
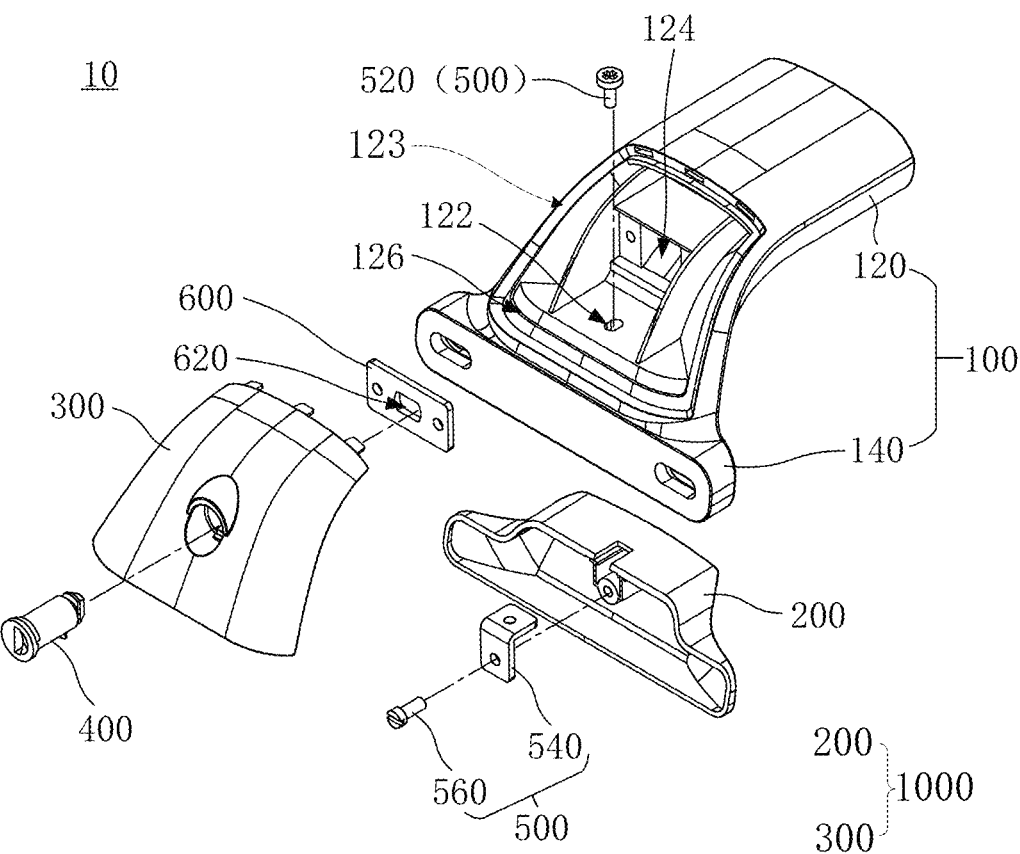
FIG. 2 is an exploded schematic diagram of the anti-theft fixing device shown in FIG. 1.
Figure 3:
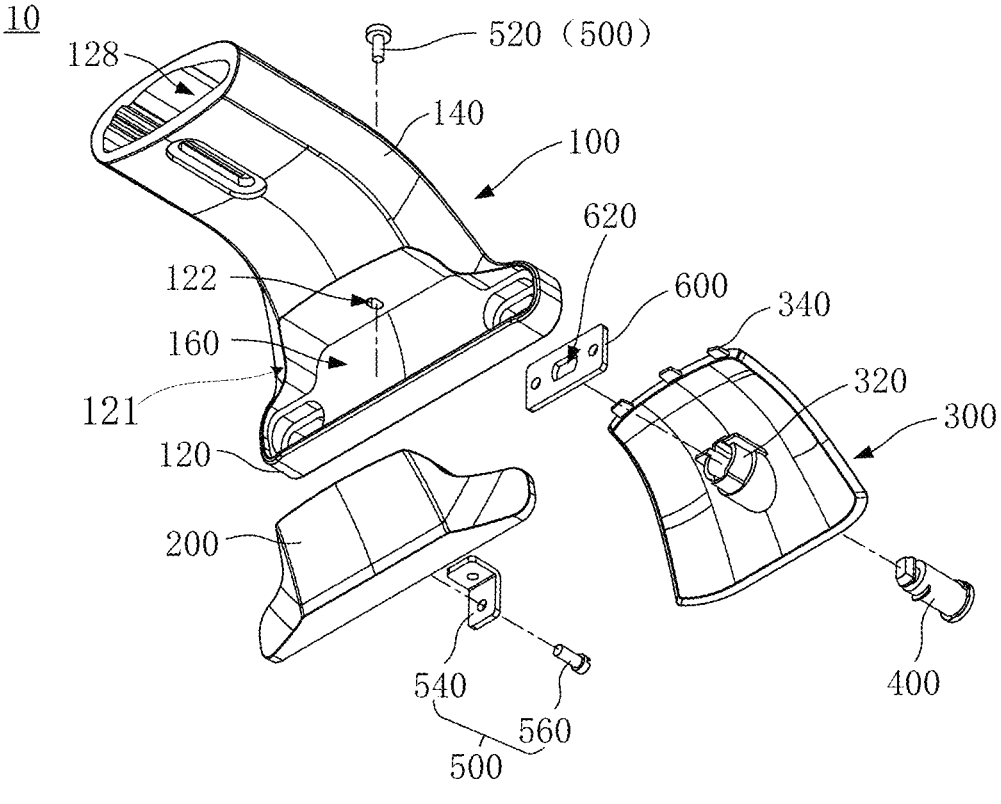
FIG. 3 is another exploded schematic diagram of the anti-theft fixing device shown in FIG. 1.

As shown in FIGS. 1-3, FIG. 1 is a perspective schematic diagram of the anti-theft fixing device according to one embodiment of the present disclosure, FIG. 2 is an exploded schematic diagram of the anti-theft fixing device shown in FIG. 1, and FIG. 3 is another exploded schematic diagram of the anti-theft fixing device shown in FIG. 1. The anti-theft fixing device includes a fixing main body 100, an anti-theft body 200, a cover body 300, and a lock member 400. The anti-theft body 200 covers at least one fixing hole 142. The at least one fixing hole 142 is defined on the fixing main body 100 for assembling with a vehicle roof fixing structure, that is, the anti-theft body 200 hides the at least one fixing hole 142, defined on the fixing main body 100 for assembling with the vehicle roof fixing structure. The cover body 300 covers the anti-theft body 200 after the anti-theft body 200 is connected to the fixing main body 100, that is, the cover body 300 hides the anti-theft body 200 after the anti-theft body 200 is connected to the fixing main body 100. The cover body 300 is detachably connected to the fixing main body 100 through the lock member 400, so that the cover body 300 is mounted on the fixing main body 100 or detached from the fixing main body 100 through controlling the lock member 400 by a mechanical key. After the cover body 300 is detached from the fixing main body 100, a component for fixing the anti-theft body 200 is exposed. Specifically, the components, such as the screws, for fixing the anti-theft body 200 are removed through a tool, such as a screwdriver, so that the anti-theft body 200 is detached from the fixing main body 100 to expose the at least one fixing hole 142 on the fixing main body 100. Thus, a risk that the anti-theft fixing device is stolen is reduced. Moreover, according to the embodiments of the present disclosure, the anti-theft body 200, the cover body 300, and the lock member 400 are respectively assembled with the fixing main body 100 in a simple and stable manner, which are convenient to assemble and disassemble, and are beneficial for users to control.

Please further refer to FIGS. 1-3, the fixing main body 100 includes a connecting portion 120 and a fixing portion 140, and the connecting portion 120 is fixedly connected with the fixing portion 140. For example, the connecting portion 120 is integrally formed with the fixing portion 140. The fixing portion 140 is disposed at a first end of the connecting portion 120, and a second end of the connecting portion 120 is fixedly connected to a connecting rod assembly. In one optional embodiment of the present disclosure, a mounting groove 128 is defined at the second end of the connecting portion 120, and the mounting groove 128 is configured to mount the connecting rod assembly. The connecting rod assembly is a connecting rod assembly in the anti-theft vehicle roof rack crossbar.

The connecting portion 120 includes a first surface and a second surface, the first surface of the connecting portion is opposite to the second surface of the connecting portion, that is, the first surface of the connecting portion 120 and the second surface of the connecting portion 120 are two opposite surfaces of the connecting portion 120. The second surface of the connecting portion 120 is understood as an outer surface of the connecting portion 120, and the first surface of the connecting portion 120 is understood as an inner surface of the connecting portion 120. The connecting portion 120 includes a mounting hole 122, the mounting hole 122 penetrates through the first surface of the connecting portion 120 and the second surface of the connecting portion 120. It should be understood that there may be one or more mounting holes 122, and the embodiments of the present disclosure take one mounting hole 122 as an example, but embodiments providing a plurality of mounting holes 122 are also within the protection scope of the embodiments of the present disclosure.

The fixing portion 140 includes a first surface and a second surface, and the first surface of the fixing portion 140 is opposite to the second surface of the fixing portion 140. The second surface of the fixing portion 140 is configured to connect to a mounting surface of an object to be mounted, such as a mounting surface of the roof of the vehicle. The second surface of the fixing portion 140 is understood as an outer surface of the fixing portion 140, and the first surface of the fixing portion 140 is understood as an inner surface of the fixing portion 140. The first surface of the fixing portion 140 is connected to the first surface of the connecting portion 120, and the second surface of the fixing portion 140 is connected to the second surface of the connecting portion 120.

The fixing portion 140 includes the at least one fixing hole 142, and the at least one fixing hole 142 penetrates through the first surface of the fixing portion 140 and the second surface of the fixing portion 140. In actual application, when the first surface of the fixing portion 140 needs to attach to the mounting surface on the roof of the vehicle, at least one component, such as at least one screw, is provided to pass through the at least one fixing hole 142 to fix the first surface of the fixing portion 140 to the mounting surface of the roof of the vehicle.

There may be two, three, or four fixing holes 142 in the present disclosure. It should be understood that the number of the at least one fixing hole 142 is not limited thereto, and is not illustrated herein. The embodiments of the present disclosure take an example that two fixing holes 142 are provided for further illustration. The two fixing holes 142 include a first fixing hole 1422 and a second fixing hole 1424.

An anti-theft portion 220 is disposed on an inner surface of the anti-theft body 200, and the anti-theft portion 220 is detachably connected to the mounting hole 122 to detachably connect the anti-theft body 200 to the first surface of the connecting portion 120, so that the anti-theft body 200 covers the at least one fixing hole 142. It is understood that covering the at least one fixing hole 142 by the anti-theft body 200 refers to covering a portion of the at least one fixing hole 142 located on the first surface of the fixing portion 140.

The anti-theft fixing device 10 further includes a fastening assembly 500, and the fastening assembly 500 passes through the mounting hole 122 from the second surface of the connecting portion 120 to fixedly connect to the anti-theft portion 220 to fix the anti-theft body 200 to the first surface of the connecting portion 120. In one optional embodiment of the present disclosure, the fastening assembly 500 includes a first fastener 520, such as a first screw 520. The first screw 520 passes through the mounting hole 122 from the second surface of the connecting portion 120 to fixedly connect to the anti-theft portion 220. When the anti-theft body 200 needs to be detached, the tool, such as the screwdriver, is provided for detaching the first screw 520, so that the anti-theft body 200 is detached from the connecting portion 120.

Figures 4, 5:
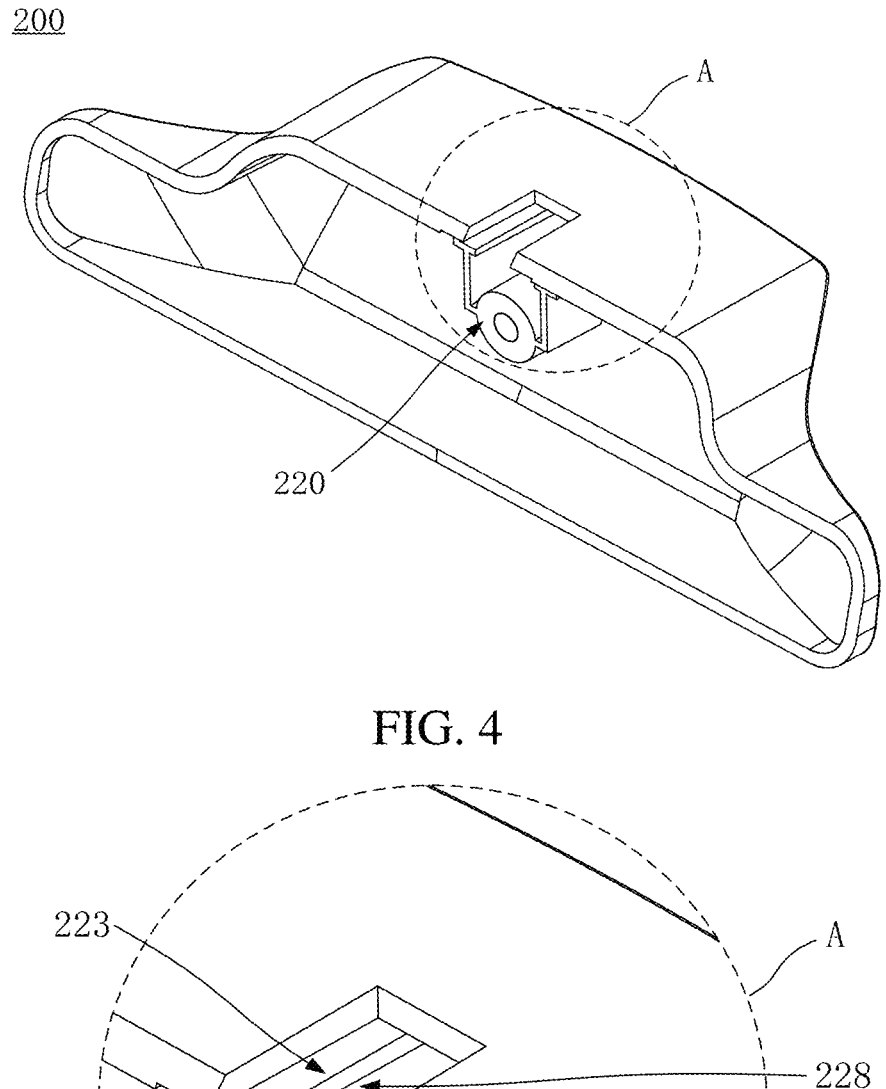
FIG. 4 is a perspective schematic diagram of an anti-theft body of the anti-theft fixing device according to one embodiment of the present disclosure.
FIG. 5 is an enlarged structural schematic diagram of portion A of the anti-theft body shown in FIG. 4.

Please refer to FIGS. 4 and 5, FIG. 4 is a perspective schematic diagram of an anti-theft body of the anti-theft fixing device according to one optional embodiment of the present disclosure, and FIG. 5 is an enlarged structural schematic diagram of portion A of the anti-theft body shown in FIG. 4. The anti-theft portion 220 includes an anti-theft groove 221, and the anti-theft groove 221 is defined on the inner surface of the anti-theft body 200. The fastening assembly 500 is detachably connected with the mounting hole 122 and the anti-theft groove 221, so that the anti-theft body 200 is detachably connect to the first surface of the connecting surface 120. For example, the first screw 520 of the fastening assembly 500 is inserted into the mounting hole 122 and the anti-theft groove 221, and is capable of being screwed with a groove wall of the anti-theft groove 221, and is also capable of being screwed with a hole wall of the mounting hole 122.

In actual application, if only a single component is provided to detachably connect the anti-theft body 200 to the first surface of the connecting portion 120, the anti-theft body 200 is difficult to be mounted or detached, that is, the anti-theft body 200 is not easy to operate in the actual application. In addition, detachably connecting the anti-theft body 200 to the first surface of the connecting portion 120 through the single component is insufficient in stability, and the anti-theft body 200 is easily damaged by foreign objects, the risk that the anti-theft fixing device is stolen may be increased. Based on this consideration, the fastening assembly 500 in the embodiments of the present disclosure further includes a second fastener 540 and a third fastener 560.

Figure 6:
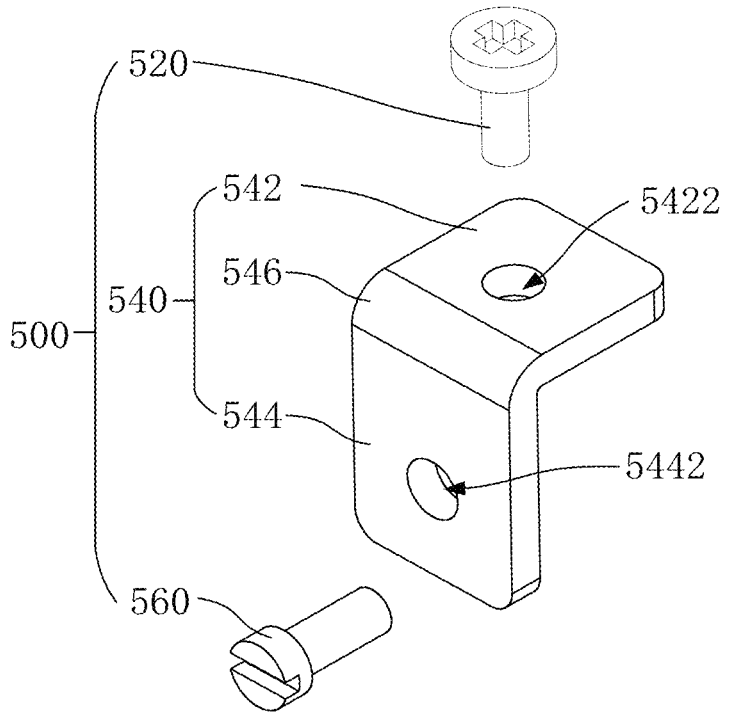
FIG. 6 is an exploded schematic diagram of a fastening assembly of the anti-theft fixing device according to one embodiment of the present disclosure.

Please refer to FIG. 6, FIG. 6 is an exploded schematic diagram of a fastening assembly of the anti-theft fixing device according to one optional embodiment of the present disclosure. In the embodiments of the present disclosure, the first fastener 520, such as the first screw 520, passes through the mounting hole 122 from the second surface of the connecting portion 120 to fixedly connect to the second fastener 540, so as to detachably connect the second fastener 540 to the connecting portion 120. For example, the first screw 520 is configured to screw with the hole wall of the mounting hole 122, and the first screw 520 is screwed with the second fastener 540. Therefore, the first screw 520, the second fastener 540, and the connecting portion 120 are detachably connected.

The third fastener 560 is partially inserted into the anti-theft groove 221 to fixedly connect to the second fastener

540, so as to detachably connect the anti-theft body 200 to the connecting portion 120. For example, the third fastener 560 includes a second screw 560, the second screw 560 is fixedly connected with the anti-theft portion 220 through the second fastener 540, the second screw 560 is partially inserted into in the anti-theft groove 221, and the groove wall of the anti-theft groove 221 is screwed with the second screw 560.

The second fastener 540 includes a first sub-portion 542 and a second sub-portion 544, the first sub-portion 542 includes a first fastening hole 5422, and the second sub-portion 544 includes a second fastening hole 5442. The first fastener 520, such as the first screw 520, partially passes through the mounting hole 122 to insert into the first fastening hole 5422, and the third fastener 560, such as the second screw 560, partially passes through the second fastening hole 5442 to insert into the anti-theft groove 221.

In one optional embodiment of the present disclosure, the connecting portion 120 is bent toward the fixing portion 140, which is beneficial for mounting the fixing portion 140 to the roof of the vehicle and is further beneficial for forming a vehicle luggage rack on the roof of the vehicle after fixedly connecting the connecting portion 120 and the connecting rod assembly.

In one optional embodiment of the present disclosure, the first sub-portion 542 is bent toward the second sub-portion 544. The first sub-portion 542 is bent toward the second sub-portion 544 to form a bending portion 546, and the bending portion 546 is connected to the first sub-portion 542 and the second sub-portion 544.

In one optional embodiment, the anti-theft portion 220 further includes a sliding groove 222 and an opening groove 223, the sliding groove 222 is defined on the inner surface of the anti-theft body 200, and the opening groove 223 is communicated with the sliding groove 222. The first sub-portion 542 is inserted into the sliding groove 222, and the opening groove 223 is communicated with the first fastening hole 5422. The first fastener 520, such as the first screw 520, partially passes through the mounting hole 122 from the second surface of the connecting portion 120 to insert into the first fastening hole 5422. The first screw 520 is configured to screw with a hole wall of the first fastening hole 5422.

In actual application, the first sub-portion 542 and the sliding groove 222 are first aligned, and then the second fastener 540 is driven to insert the first sub-portion 542 into the sliding groove 222. The third fastener 560, such as the second screw 560, is then detachably connected with the second fastening hole 5442 and the anti-theft groove 221 to detachably mount the second fastener 540 on the anti-theft body 200. Then, the first fastener 520, such as the first screw 520, is detachably connected with the mounting hole 122 and the first fastening hole 5422 to detachably mount the anti-theft body 200 on the connecting portion 120. The second screw 560 is configured to screw with a hole wall of the second fastening hole 5442, and the second screw 560 is further configured to screw with the groove wall of the anti-theft groove 221.

In order to increase stability of the anti-theft portion 220, in one optional embodiment of the present disclosure, the anti-theft portion 220 further includes an anti-theft post 224 disposed on the inner surface of the anti-theft body 200, and the anti-theft groove 221 is defined on the anti-theft post 224. When the first sub-portion 542 is inserted into the sliding groove 222, the second sub-portion 544 is attached to the anti-theft post 224, so that the anti-theft groove 221 and the second fastening hole 5442 are aligned and communicated to facilitate the third fastener 560, such as the second screw 560, to pass through the second fastening hole 5442 and the anti-theft groove 221. The anti-theft post 224 not only increases strength of the anti-theft portion 220, but also facilitate alignment of the anti-theft groove 221 and the second fastening hole 5442.

In order to further increase the stability of the anti-theft portion 220, in one optional embodiment of the present disclosure, the anti-theft portion 220 further includes a first reinforcing plate 225 and a second reinforcing plate 226. The first reinforcing plate 225 and the second reinforcing plate 226 are fixedly connected to the anti-theft post 224 and a bottom wall 227 forming the sliding groove 222. The first reinforcing plate 225 and the second reinforcing plate 226 are respectively located at two sides of the anti-theft post 224. A through hole 228 is defined on the bottom wall 227, and the through hole 228 is communicated with the sliding groove 222.

In order to further increase the stability of the anti-theft portion 220, in one optional embodiment of the present disclosure, the anti-theft fixing device further includes a reinforcing component, which is illustrated with reference to the accompanying drawings.

Figure 7:
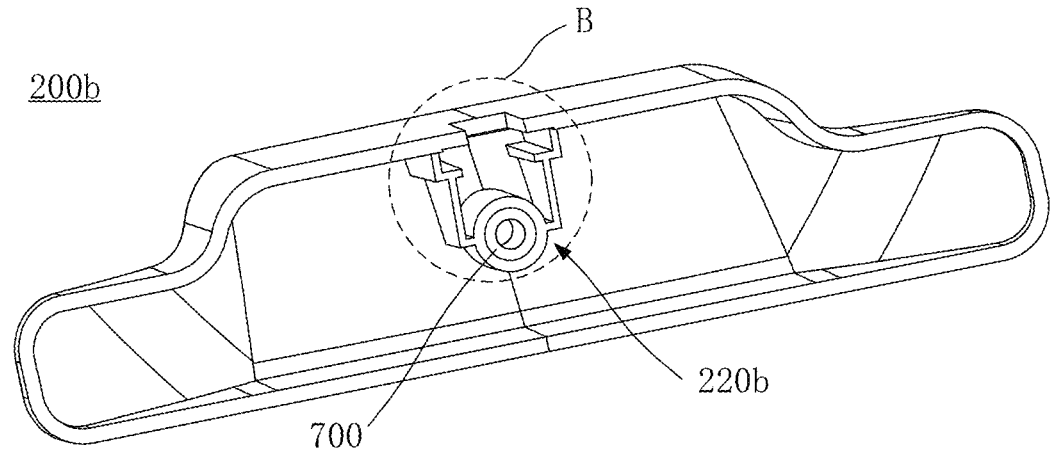
FIG. 7 is a perspective schematic diagram of the anti-theft body of the anti-theft fixing device according to another embodiment of the present disclosure.
Figure 8:
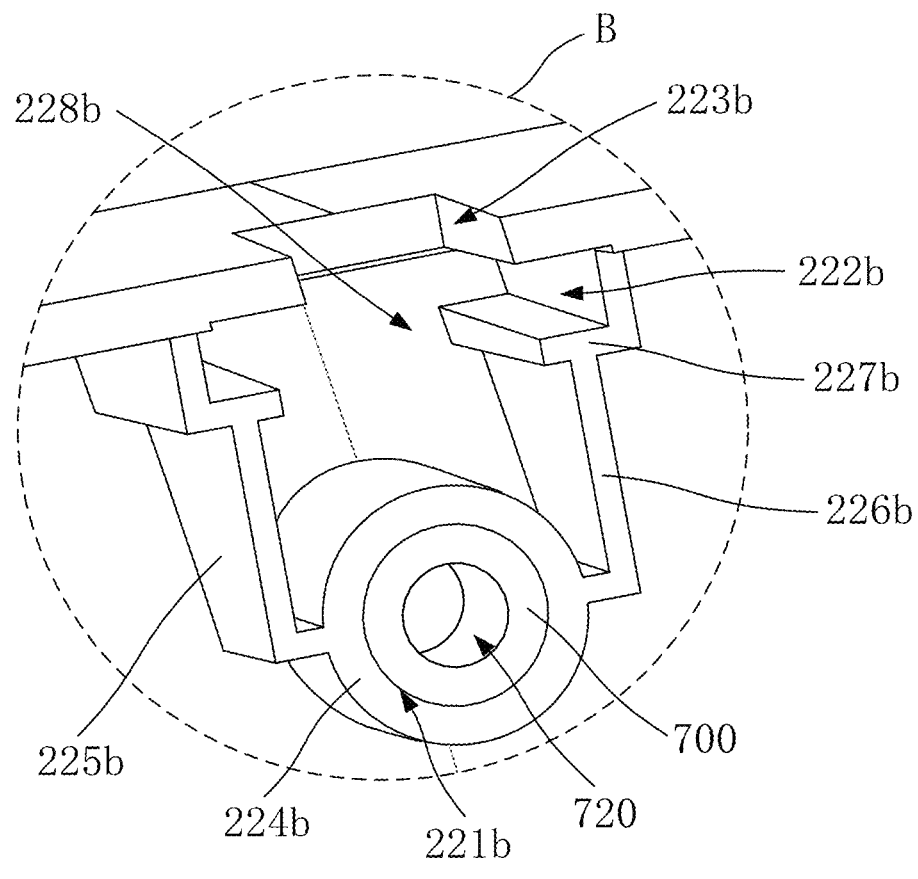
FIG. 8 is an enlarged schematic diagram of portion B of the anti-theft body shown in FIG. 7.

Please refer to FIGS. 7-8, FIG. 7 is a perspective schematic diagram of the anti-theft fixing device according to another embodiment of the present disclosure, and FIG. 8 is an enlarged schematic diagram of portion B of the anti-theft body shown in FIG. 7. Difference between the anti-theft body 200b of the anti-theft fixing device in the embodiment and the anti-theft body 200 in the anti-theft fixing device is as follow. A reinforcing component 700 is disposed in the anti-theft groove 221b of the anti-theft body 200b, strength of the reinforcing component 700 is greater than strength of the anti-theft post 224b. For example, the reinforcing component 700 is made of a metal material, and the anti-theft post 224b is made of a plastic material. The reinforcing component 700 includes a reinforcing groove 720, and the third fastener, such as the third fastener 560, partially passes through the second fastening hole, such as the second fastening hole 5442, to insert into the reinforcing groove 720, to fixedly connect to the reinforcing component 700. The reinforcing component 700 may be fixed in the anti-theft groove 221b in an injection molding manner through a mold, and the reinforcing component 700 is fixedly connected to the anti-theft post 224b.

The first reinforcing plate 225b, the second reinforcing plate 226b, the sliding groove 222b, the opening groove 223b, and the through hole 228b may all refer to FIGS. 4-5, and details are not described herein again.

In one optional embodiment of the present disclosure, the anti-theft fixing device 10 further includes a first accommodating groove 160. The first accommodating groove 160 is defined on the connecting portion 120 and the fixing portion 140, that is, the first accommodating groove 160 is formed on the first surface of the connecting portion 120 and the first surface of the fixing portion 140. The anti-theft body 200 is partially inserted into the first accommodating groove 160. An edge of the anti-theft body 200 is flush with the connecting portion 120 and the fixing portion 140.

The foregoing is an example of a detachable connection manner of the anti-theft body 200 and the connecting portion 120 of the embodiments of the present disclosure. Please further refer to FIGS. 1-3 and 6, following description mainly refers to detachably connecting the cover body 300 to the connecting portion 120 through the lock member 400.

The cover body 300 is detachably connected to the second surface of the connecting portion 120, so as to cover the mounting hole 122. The lock member 400 is configured to detachably connect the cover body 300 to the connecting portion, that is, the cover body 300 is detachably connected to the second surface of the connecting portion 120 through the lock member 400.

In one optional embodiment of the present disclosure, the cover body 300 includes a limiting structure 320, the limiting structure 320 is matched with the lock member 400 and allows the lock member 400 to pass through, so as to fix the cover body 300 to the connecting portion 120 or detach the cover body 300 from the connecting portion 120. The connecting portion 120 includes a moving groove 124, and the lock member 400 moves in the moving groove 124. The lock member 400 is controlled to move in the moving groove 124 through the mechanical key, the lock member 400 passes through the limiting structure 320 and is limited in the moving groove 124, so the cover body 300 is fixed on the connecting portion 120, thereby covering the mounting hole 122. Moreover, the lock member 400 is withdrawn from the limiting structure 320, so that the lock member 400 is taken out of the moving groove 124 and the cover body 300 is detached from the connecting portion 120, thereby exposing the mounting hole 122.

In one optional embodiment of the present disclosure, the anti-theft fixing device 10 further includes a clamping plate 600, the clamping plate 600 includes a moving hole 620, the clamping plate 600 is fixed on the connecting portion 120, the moving hole 620 is communicated with the moving groove 124, and the lock member 400 moves in the moving groove 124 and the moving hole 620. The lock member 400 is limited by the clamping plate 600, so as to fix the cover body 300 to the connecting portion 120. Or, the lock member 400 is withdrawn from the moving groove 124 and the moving hole 620, so as to detach the cover body 300 from the connecting portion 120.

In one optional embodiment of the present disclosure, the anti-theft fixing device 10 further includes a second accommodating groove 126, the second accommodating groove 126 is defined on the connecting portion 120, and the cover body 300 is partially inserted into the second accommodating groove 126. An edge of the cover body 300 is flush with the connecting portion 120.

It should be noted that, in other optional embodiments of the present disclosure, the cover body 300 is directly matched and fixedly connected with the anti-theft body 200 through the lock member 400. For example, the lock member 400 passes through the mounting hole 122 to fixedly connect the cover body 300 and the anti-theft body 200 together. Certainly, the lock member 400 is also capable of being withdrawn from the mounting hole 122 to separate the cover body 300 from the anti-theft body 200. It is understood that a structure of the mounting hole 122 is adjustable in size and shape according to actual requirements.

Figure 9:
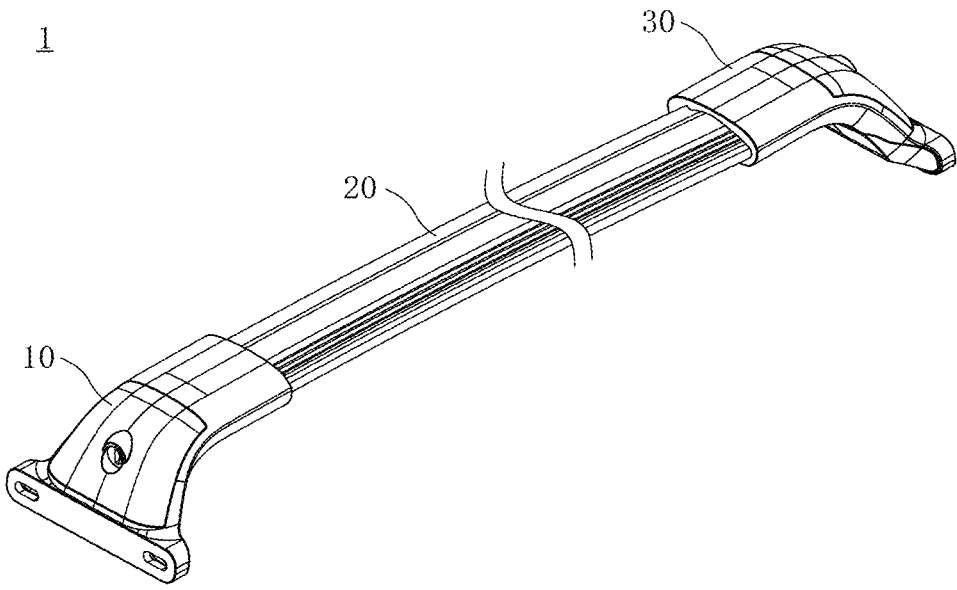
FIG. 9 is a perspective schematic diagram of an anti-theft vehicle roof rack crossbar according to one embodiment of the present disclosure.
Figure 10:
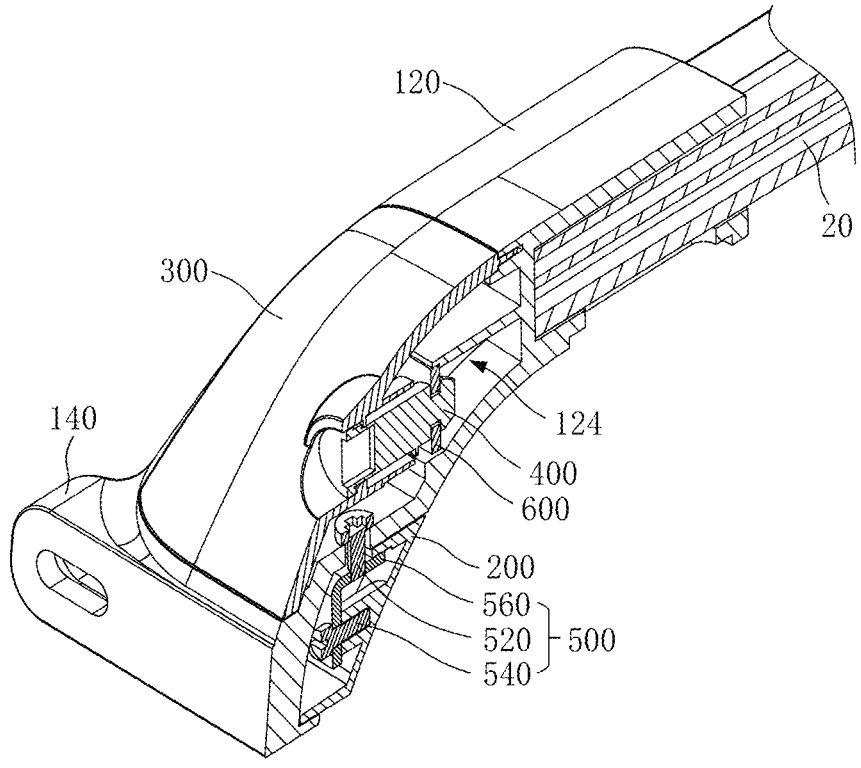
FIG. 10 is a partial cross-sectional schematic diagram of the anti-theft vehicle roof rack crossbar shown in FIG. 9.

Please refer to FIGS. 9-10, FIG. 9 is a perspective schematic diagram of an anti-theft vehicle roof rack crossbar according to one optional embodiment of the present disclosure, and FIG. 10 is a partial cross-sectional schematic diagram of the anti-theft vehicle roof rack crossbar shown in FIG. 9. The anti-theft vehicle roof rack crossbar 1 includes a first anti-theft fixing device 10, a second anti-theft fixing device 30, and a connecting rod assembly 20. The connecting rod assembly 20 is connected to the first anti-theft fixing device 10 and the second anti-theft fixing device 30. The first anti-theft fixing device 10 and the second anti-theft fixing device 30 are respectively located at two ends of the connecting rod assembly 20, that is, the first anti-theft fixing device 10 is located at a first end of the connecting rod assembly 20 and the second anti-theft fixing device 30 is located at a second end of the connecting rod assembly 20. The first end of the connecting rod assembly 20 is opposite to the second end of the connecting rod assembly 20.

With reference to FIGS. 1-8, in the embodiment, the first anti-theft fixing device 10 is the anti-theft fixing device 10 as foregoing, and the second anti-theft fixing device 30 is the anti-theft fixing device as foregoing. The first end of the connecting rod assembly 20 is disposed in the mounting groove of the fixing main body of the first anti-theft fixing device 10, such as the mounting groove 128 of the fixing main body 100 of the anti-theft fixing device 10. The second end of the connecting rod assembly 20 is disposed in the mounting groove of the fixing main body of the second anti-theft fixing device 30, such as the mounting groove 128 of the fixing main body 100 of the anti-theft fixing device 10.

Specific structures of the first anti-theft fixing device 10 and the second anti-theft fixing device 30 may refer to the above content, and details are not described herein again.

In one optional embodiment of the present disclosure, the first anti-theft fixing device 10 and the second anti-theft fixing device 30 are symmetrically disposed with respect to the connecting rod assembly 20.

The anti-theft fixing device and the anti-theft vehicle roof rack crossbar provided by the embodiments of the present disclosure are described in detail, and specific examples are used herein to describe the principles and embodiments of the present disclosure, and the above method and the core idea thereof; at the same time, for those who skilled in the art, according to the idea of the present disclosure, in a specific implementation manner and an application range, the content should be changed. In summary, the content of the present specification should not be construed as a limitation to the present disclosure.

As shown in FIGS. 1-8, in some embodiments of the present disclosure, an anti-theft fixing device is provided and includes a fixing main body 100, an anti-theft assembly 1000, and a lock member 400. The fixing main body 100 defines at least one fixing hole 142. The anti-theft assembly 1000 is connected to the fixing main body 100 and covers the at least one fixing hole 142. The lock member 400 is mounted to the anti-theft assembly 1000 and is configured to lock the anti-theft assembly 1000 to the fixing main body 100.

In some embodiments, the fixing main body 100 defines a first accommodating groove 160 communicated with the at least one fixing hole 142. The anti-theft assembly 1000 is insertable to the first accommodating groove 160 from a side of the fixing main body 100, and is at least partially accommodated in the first accommodating groove 160.

In some embodiments, the fixing main body 100 includes a fixing portion 140 and a connecting portion 120 fixedly connected to the fixing portion 140. The at least one fixing hole 142 is formed in the fixing portion 140. The connecting portion 120 defines a mounting hole 122 and includes a first surface 121 and a second surface 123 opposite to the first surface 121. The anti-theft assembly 1000 includes an anti-theft body 200 and a cover body 300. The anti-theft body 200 is at least partially arranged on the first surface 121, detachably mounted to the connecting portion 120 via the mounting hole 122, and covers the at least one fixing hole 142. The cover body 300 is at least partially arranged on the second surface 123, detachably mounted to the connecting portion 120, and covers the mounting hole 122. The lock member 400 is configured to detachably lock the cover body 300 to the connecting portion 120.

In some embodiments, a side of the anti-theft body 200 facing the cover body 300 is arranged with an anti-theft portion 220. The anti-theft portion 220 is mounted to the connecting portion 120 via the mounting hole 122.

In some embodiments, the anti-theft portion 220 defines an anti-theft groove 221. The anti-theft fixing device further includes a fastening assembly 500 detachably connecting the anti-theft body 200 to the first surface 121 of the connecting portion 120 via the mounting hole 122 and the anti-theft groove 221. The anti-theft body 200 covers the fastening assembly 500 on a side of the first surface 121. The cover body 300 covers the fastening assembly 500 on a side of the second surface 123.

In some embodiments, the fastening assembly 500 includes a first fastener 520, a second fastener 540, and a third fastener 560. The first fastener 520 passes through the mounting hole 122, is fixedly connected to the second fastener 540, and detachably connects the second fastener 540 to the connecting portion 120. The third fastener 560 is partially inserted in the anti-theft groove 221, is connected to the second fastener 540, and detachably connects the anti-theft body 200 to the connecting portion 120.

In some embodiments, the second fastener 540 includes a first sub-portion 542 and a second sub-portion 544. The first sub-portion 542 defines a first fastening hole 5422. The second sub-portion 544 defines a second fastening hole 5442. The first fastener 520 partially passes through the mounting hole 122 and the first fastening hole 5422 and is inserted in the first fastening hole 5422. The third fastener 560 partially passes through the second fastening hole 5442 and is inserted in the anti-theft groove 221.

In some embodiments, the connecting portion 120 is bent toward the fixing portion 140. The first sub-portion 542 is bent toward the second sub-portion 544.

In some embodiments, the anti-theft portion 220 further defines a sliding groove 222 and an opening groove 223 communicated with the sliding groove 222. The first sub-portion 542 is inserted in the sliding groove 222. The opening groove 223 is communicated with the first fastening hole 5422.

In some embodiments, the anti-theft portion 220 further includes an anti-theft post 224, and the anti-theft groove 221 is formed in the anti-theft post 224.

In some embodiments, the anti-theft portion 220 further includes a first reinforcing plate 225 and a second reinforcing plate 226. Each of the first reinforcing plate 225 and the second reinforcing plate 226 is fixedly connected to the anti-theft post 224 and a bottom wall 227 for defining the sliding groove 222. Each of the first reinforcing plate 225 and the second reinforcing plate 226 is located on a respective side of two sides of the anti-theft post 224.

In some embodiments, the anti-theft portion 220 further includes a reinforcing component 700. The reinforcing component 700 is disposed in the anti-theft groove 221. The reinforcing component 700 defines a reinforcing groove 720. The third fastener 560 at least partially passes through the second fastening hole 5442, is inserted in the reinforcing groove 720, and is fixedly connected to the reinforcing component 700.

In some embodiments, the cover body 300 includes a limiting structure 320. The limiting structure 320 is matched with the lock member 400. The cover body 300 is fixed to the connecting portion 120 or is detached from the connecting portion 120 via a movement of the lock member 400.

In some embodiments, the connecting portion 120 defines a moving groove 124. The lock member 400 is movable in the moving groove 124.

In some embodiments, the anti-theft fixing device further includes a clamping plate 600. The clamping plate 600 defines a moving hole 620. The clamping plate 600 is fixed to the connecting portion 120. The moving hole 620 is communicated with the moving groove 124. The lock member 400 is movable in the moving groove 124 and the moving hole 620. The lock member 400 is limited by the clamping plate 600, and is configured to fix the cover body 300 to the connecting portion 120. The lock member 400 is capable of exiting from the moving groove 124 and the moving hole 620 and detaches the cover body 300 from the connecting portion 120.

In some embodiments, the anti-theft fixing main body 100 further defines a second accommodating groove 126 communicated with the first accommodating groove 160. The anti-theft assembly 1000 is at least partially accommodated in the second accommodating groove 126.

In some embodiments, an anti-theft fixing device is provided and includes a fixing main body 100, an anti-theft assembly 1000, and a lock member 400. The fixing main body 100 includes a fixing portion 140 and a connecting portion 120 fixedly connected to the fixing portion 140. The fixing portion 140 defines at least one fixing hole 142. The fixing portion 140 and the connecting portion 120 cooperatively define a first accommodating groove 160 communicated with the at least one fixing hole 142. The anti-theft assembly 1000 is at least partially accommodated in the first accommodating groove 160, connected to the fixing main body 100, and covers the at least one fixing hole 142. The lock member 400 is mounted to the anti-theft assembly 1000, and is configured to lock the anti-theft assembly 1000 to the fixing main body 100.

In some embodiments, the connecting portion 120 defines a second accommodating groove 126 and a mounting hole 122. The second accommodating groove 126 is communicated with the first accommodating groove 160 via the mounting hole 122. The anti-theft assembly 1000 includes an anti-theft body 200 and a cover body 300. The anti-theft body 200 is at least partially accommodated in the first accommodating groove 160, detachably mounted to the connecting portion 120 via the mounting hole 122, and covers the at least one fixing hole 142. The cover body 300 is at least partially accommodated in the second accommodating groove 126, detachably mounted to the connecting portion 120, and covers the mounting hole 122. The lock member 400 is configured to detachably lock the cover body 300 to the connecting portion 120.

What is claimed is:

1. An anti-theft fixing device, comprising:
   a fixing main body, comprises a fixing portion, the fixing portion defining at least one fixing hole; and
   an anti-theft assembly, connected to the fixing main body and comprising an anti-theft body, the anti-theft body covering the at least one fixing hole;
   wherein, each of the at least one fixing hole is configured to be directly fixed to a mounting surface of a roof of a vehicle; each of the at least one fixing hole penetrates the fixing portion and generates two openings respectively on two opposite surfaces of the fixing portion; the anti-theft body covers one of the two openings of each of the at least one fixing hole; and another one of the two openings is configured to be directly fixed to the mounting surface of the roof of the vehicle.

2. The anti-theft fixing device according to claim 1, wherein the fixing main body defines a first accommodating groove communicated with the at least one fixing hole; the anti-theft assembly is insertable to the first accommodating groove from a side of the fixing main body, and is at least partially accommodated in the first accommodating groove.

3. The anti-theft fixing device according to claim 1, wherein the fixing main body further comprises a connecting portion fixedly connected to the fixing portion, the connecting portion defines a mounting hole and comprises a first surface and a second surface opposite to the first surface; the anti-theft assembly further comprises:
   a cover body, at least partially arranged on the second surface, detachably mounted to the connecting portion, and covering the mounting hole; and
   wherein, the anti-theft body is at least partially arranged on the first surface, detachably mounted to the connecting portion via the mounting hole, and covering the at least one fixing hole; and a lock member is configured to detachably lock the cover body to the connecting portion.

4. The anti-theft fixing device according to claim 3, wherein a side of the anti-theft body facing the cover body is arranged with an anti-theft portion, and the anti-theft portion is mounted to the connecting portion via the mounting hole.

5. The anti-theft fixing device according to claim 4, wherein:
   the anti-theft portion defines an anti-theft groove; and
   the anti-theft fixing device further comprises a fastening assembly detachably connecting the anti-theft body to the first surface of the connecting portion via the mounting hole and the anti-theft groove;
   the anti-theft body covers the fastening assembly on a side of the first surface, and the cover body covers the fastening assembly on a side of the second surface.

6. The anti-theft fixing device according to claim 5, wherein:
   the fastening assembly comprises a first fastener, a second fastener, and a third fastener;
   the first fastener passes through the mounting hole, is fixedly connected to the second fastener, and detachably connects the second fastener to the connecting portion;
   the third fastener is partially inserted in the anti-theft groove, is connected to the second fastener, and detachably connects the anti-theft body to the connecting portion.

7. The anti-theft fixing device according to claim 6, wherein:
   the second fastener comprises a first sub-portion and a second sub-portion, the first sub-portion defines a first fastening hole, and the second sub-portion defines a second fastening hole;
   the first fastener partially passes through the mounting hole and the first fastening hole and is inserted in the first fastening hole;
   the third fastener partially passes through the second fastening hole and is inserted in the anti-theft groove.

8. The anti-theft fixing device according to claim 7, wherein the connecting portion is bent toward the fixing portion, and the first sub-portion is bent toward the second sub-portion.

9. The anti-theft fixing device according to claim 7, wherein the anti-theft portion further defines a sliding groove and an opening groove communicated with the sliding groove, the first sub-portion is inserted in the sliding groove, and the opening groove is communicated with the first fastening hole.

10. The anti-theft fixing device according to claim 9, wherein the anti-theft portion further comprises an anti-theft post, and the anti-theft groove is formed in the anti-theft post.

11. The anti-theft fixing device according to claim 10, wherein the anti-theft portion further comprises a first reinforcing plate and a second reinforcing plate, each of the first reinforcing plate and the second reinforcing plate is fixedly connected to the anti-theft post and a bottom wall for defining the sliding groove, and each of the first reinforcing plate and the second reinforcing plate is located on a respective side of two sides of the anti-theft post.

12. The anti-theft fixing device according to claim 6, wherein the anti-theft portion further comprises a reinforcing component, the reinforcing component is disposed in the anti-theft groove, the reinforcing component defines a reinforcing groove, the third fastener at least partially passes through the second fastening hole, is inserted in the reinforcing groove, and is fixedly connected to the reinforcing component.

13. The anti-theft fixing device according to claim 3, wherein the cover body comprises a limiting structure, the limiting structure is matched with the lock member, and the cover body is fixed to the connecting portion or is detached from the connecting portion via a movement of the lock member.

14. The anti-theft fixing device according to claim 3, wherein the connecting portion defines a moving groove, and the lock member is movable in the moving groove.

15. The anti-theft fixing device according to claim 14, wherein;

the anti-theft fixing device further comprises a clamping plate, the clamping plate defines a moving hole, the clamping plate is fixed to the connecting portion, the moving hole is communicated with the moving groove, and the lock member is movable in the moving groove and the moving hole;

the lock member is limited by the clamping plate, and is configured to fix the cover body to the connecting portion;

the lock member is capable of exiting from the moving groove and the moving hole and detaches the cover body from the connecting portion.

16. The anti-theft fixing device according to claim 2, wherein the anti-theft fixing main body further defines a second accommodating groove communicated with the first accommodating groove, and the anti-theft assembly is at least partially accommodated in the second accommodating groove.

17. The anti-theft fixing device according to claim 1, wherein the connecting portion defines a second accommodating groove and a mounting hole, and the second accommodating groove is communicated with the first accommodating groove via the mounting hole; the anti-theft assembly comprises:

an anti-theft body, at least partially accommodated in the first accommodating groove, detachably mounted to the connecting portion via the mounting hole, and covering the at least one fixing hole; and a cover body, at least partially accommodated in the second accommodating groove, detachably mounted to the connecting portion, and covering the mounting hole, the lock member is configured to detachably lock the cover body to the connecting portion.

18. An anti-theft vehicle roof rack crossbar, comprising:

a first anti-theft fixing device, located at a first end of the connecting rod assembly;

a second anti-theft fixing device, located at a second end of the connecting rod assembly; and a connecting rod assembly, connected to the first anti-theft fixing device and the second anti-theft fixing device;

wherein the first anti-theft fixing device is the anti-theft fixing device according to claim 1, and the second anti-theft fixing device is the anti-theft fixing device according to claim 1.

19. The anti-theft vehicle roof rack crossbar according to claim 18, wherein the first anti-theft fixing device and the second anti-theft fixing device are symmetrically disposed with respect to the connecting rod assembly.

* * * * *